A. B. WELTY.
THRESHING MACHINE.
APPLICATION FILED MAY 1, 1916.
1,210,571. Patented Jan. 2, 1917.
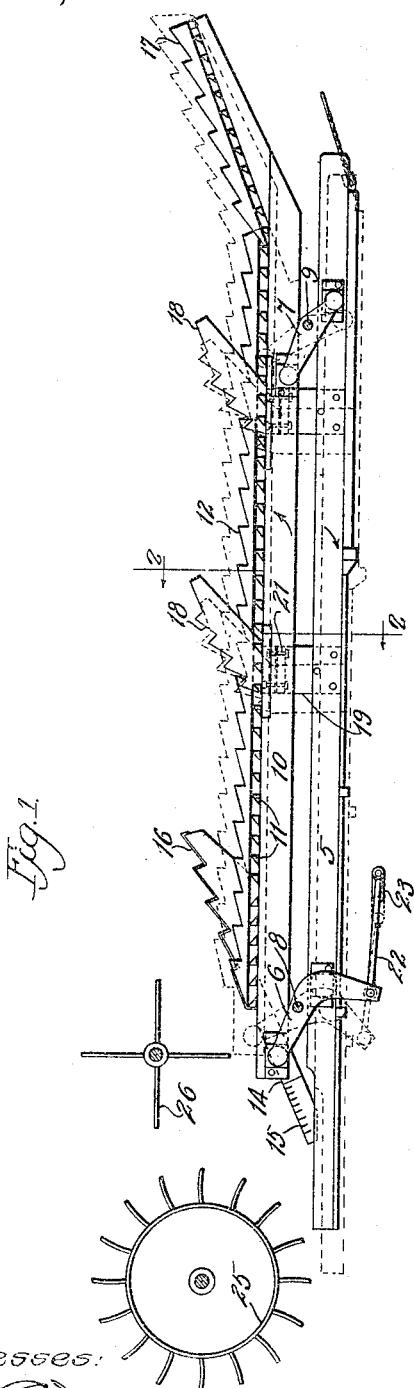
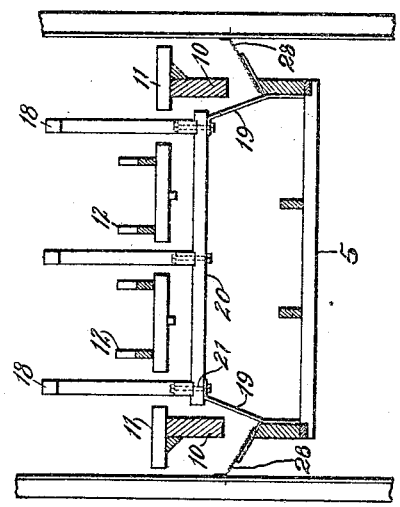
Witnesses:
Geo. L. Davison
E. H. Roessner
Inventor:
Albert B. Welty,
By James A. Walsh,
Atty.

UNITED STATES PATENT OFFICE.

ALBERT B. WELTY, OF RACINE, WISCONSIN, ASSIGNOR TO J. I. CASE THRESHING MACHINE COMPANY, OF RACINE, WISCONSIN, A CORPORATION.

THRESHING-MACHINE.

1,210,571.

Specification of Letters Patent.

Patented Jan. 2, 1917.

Application filed May 1, 1916. Serial No. 94,594.

*To all whom it may concern:*

Be it known that I, ALBERT B. WELTY, a citizen of the United States, residing at Racine, in the county of Racine and State of Wisconsin, have invented certain new and useful Improvements in Threshing-Machines, of which the following is a specification.

My present invention relates to improvements in threshing machines, and particularly to that mechanism thereof over which the straw is propelled during its travel from the cylinder to the discharge end of the machine to be acted upon by such mechanism for the purpose of separating the grain from the straw, and which is generally referred to as the straw rack; my object being to provide such a rack, and its associated grain conveyer or pan, with means for continuously agitating the straw in a thorough and positive manner so that the grain-laden straw under treatment by the rack will be subject to further and more complete separation, and which devices are combined in a manner to insure simplicity in arrangement, durability and efficiency, as will be hereinafter more particularly explained.

In the accompanying drawing, which forms a part hereof, Figure 1 is a side elevation of my improved straw rack and grain conveyer, showing an ordinary cylinder and beater associated therewith, and Fig. 2 is a transverse sectional view of the rack as seen when looking in the direction indicated by the arrows from the dotted lines 2—2 in Fig. 1.

In the drawings, the portions marked 5 indicate a grain pan or conveyer of any appropriate construction, near the forward opposite sides of which I secure bell-cranks, 6, and near their rear opposite sides links, 7, are secured, which cranks and links, by their pivots, 8 and 9, are mounted in the casing of the machine. At the upper ends of said cranks and links the straw rack, 10, is pivotally mounted, which comprises the usual longitudinal members to which are secured the triangular shaped cross-slats, 11, and at intervals between said longitudinal members 10 of the rack and extending above the surface of said slats 11 are serrated longitudinal members, 12, or what are commonly called fish-backs, said slat and fish-back arrangement being provided for a purpose well known in the art. At the forward end of said rack 10, and inclined downwardly therefrom, is an extension, 14, having a grating, 15, in the portion thereof which communicates with the grain pan 5, and at the rear end of said extension fixedly secured to the rack is a series of agitators, 16, the rear end of said rack terminating in a series of upwardly inclined agitators, 17. Secured to the grain pan 5 are two series (preferably comprising three each or more) of agitators, 18, the standards, 19, of which are affixed to said pan and connected by a cross piece, 20, and the inclined serrated members 18 of which are bolted to said standards and cross piece, at 21, but, as is obvious, each of said agitators may be formed of a single piece of material suitably braced in any effective manner. The upper ends or inclined portions of these agitators project through suitable interstices in the rack at intervals between the fish-backs 12 and terminate in substantial alinement with the extreme upper end of the forward fixed agitator. At the lower arm of bell-crank 6 a pitman, 22, is secured which communicates with a crank, 23, driven by any suitable source by the threshing machinery.

In the operation of the machine, the grain pan 5, through the crank 23, pitman 22, and bell-crank 6, is given both a longitudinally and downwardly reciprocating movement, as indicated by dotted lines in Fig. 1, and simultaneously therewith, through the action of said bell-crank and the link 7, the rack 10, with its forward and rearward extensions and other fixed parts associated therewith, is given a longitudinally and upwardly reciprocating movement in opposite directions to the movement of the grain pan, the vertical movement of each structure being in a curvilinear path; in other words, as the grain pan is moving forwardly and downwardly the straw rack is at the same time moving rearwardly and upwardly and vice versa, so that the agitators, actuated by the grain pan, are projecting and receding through the rack substantially as indicated by the dotted lines. During this operation the grain is being fed into the cylinder, 25, the teeth thereof threshing the greater portion of the grain from the straw, while the beater, 26, directs the moving masses of straw onto the straw rack. Much of the grain flying rearwardly from the cylinder enters the grating 15 in the front extension 14 of the rack 5, and is deflected therethrough into the grain pan, as will be understood. The straw is being constantly directed onto the rack the reciprocatory movement of which carries the same rearwardly over the forward fixed agitator 16, causing it to tumble over onto the fish-backs or slats to be agitated and shaken until it reaches the first series of movable agitators 18, which latter further spread and disturb the arrangement of the straws and throw them rearwardly onto the fish-backs to be agitated and shaken, and thence carried onto the rear series of projecting and receding agitators, where the mass is again subjected to rearrangement and precipitation onto the fish-backs, from which it is propelled over the inclined rear extension. In this manner the straw traveling over the rack throughout its entire surface is being constantly shaken and tossed over the fish-backs and agitated and tumbled by the agitators, so that the straw mass is being disturbed and disarranged incessantly, with the result that the grains are shaken and sifted through the straw onto the slatted floor of the rack through which it escapes and discharges into the grain pan to be conveyed away thereby and saved. At each side of the grain pan 5 I attach suitable flexible material, 28, extending therefrom to the separator casing, for the purpose of directing grain into said pan which may work over the sides of the straw rack near the casing, which is a common expedient for such purpose. By this arrangement of constantly and effectually agitating and disarranging the straws I am enabled to thoroughly separate and save the grain therefrom, and by associating and operating the mechanism in the manner described, I have in actual practice demonstrated that the structures are so substantially combined as to insure that the movements thereof are at all times uniform and efficient for the purpose, without liability of straining or displacement through the rapid operation which is necessary in actual field threshing, during which many tons of material are handled daily.

I am aware that racks having agitating members for the purpose have been heretofore employed, and which I do not broadly claim, but What I do claim is:

1. The combination, in a threshing machine, of a longitudinally and downwardly reciprocatory grain pan, fixedly secured serrated agitators mounted upon said grain pan and movable therewith, a longitudinally and upwardly reciprocatory straw-rack above said pan through which such agitators project and recede, a bell-crank connecting said pan and said rack, a link connecting said structures, and means for actuating said bell-crank to simultaneously reciprocate said pan in a longitudinal, downward and curvilinear direction and said rack in a longitudinal, upward and curvilinear direction and for imparting projecting and receding motion to said agitators.

2. The combination, in a threshing machine, of a longitudinally and downwardly reciprocatory grain pan, fixedly secured agitators mounted upon said grain pan and movable therewith, a longitudinally and upwardly reciprocatory straw-rack above said pan through which such agitators project and recede, an inclined forward grated extension communicating with said rack, agitators fixedly secured to said rack in the rear of said extension, means connecting said pan and said rack for imparting longitudinal and vertical reciprocation thereto in opposite directions, and means communicating with said connecting means for actuating the same.

3. The combination, in a threshing machine, of a longitudinally and downwardly reciprocatory grain pan, agitators fixedly secured therein comprising standards and inclined serrated members mounted thereon, a longitudinally and upwardly reciprocatory straw-rack above said pan through which said agitators project and recede, pivotally mountable links connecting said pan and rack near their rear opposite sides, pivotally mountable bell-cranks connecting said structures near their forward opposite sides, a pitman connected to an arm of said bell-crank, and a crank communicating with said pitman for actuating said bell-crank to longitudinally, vertically and curvilinearly reciprocate said pan and said rack.

In testimony whereof I affix my signature in presence of two witnesses.

ALBERT B. WELTY.

Witnesses:
WALLACE F. MACGREGOR,
JAMES A. WALSH.

Copies of this patent may be obtained for five cents each, by addressing the "Commissioner of Patents, Washington, D. C."